United States Patent
Campbell

[11] Patent Number: 5,802,760
[45] Date of Patent: Sep. 8, 1998

[54] FISHING BUCKET

[76] Inventor: Jason E. Campbell, 119 Bob Sikes Blvd. #12, Ft. Walton Beach, Fla. 32547

[21] Appl. No.: 713,360

[22] Filed: Sep. 13, 1996

[51] Int. Cl.$^6$ .................................................. A01K 97/05
[52] U.S. Cl. .................................. 43/57; 43/54.1; 43/55; 43/56; 206/315.11
[58] Field of Search .................................. 43/55, 56, 57, 43/54.1; 206/315.11; 261/121.2; 62/371, 457.2, 457.3, 457.4

[56] References Cited

U.S. PATENT DOCUMENTS

| | | | |
|---|---|---|---|
| 1,587,785 | 6/1926 | Marsh | 43/56 |
| 2,680,424 | 6/1954 | Brown | 119/3 |
| 2,870,932 | 1/1959 | Davis | 43/56 |
| 3,005,671 | 10/1961 | Majeski | 206/315.11 |
| 3,191,337 | 6/1965 | Fant | 43/57 |
| 3,499,244 | 3/1970 | Malone | 43/56 |
| 3,751,845 | 8/1973 | Van Leeuwen | 43/56 |
| 3,958,359 | 5/1976 | Doughty | 43/55 |
| 4,353,182 | 10/1982 | Junkas | 43/55 |
| 4,428,145 | 1/1984 | Wheeler | 43/55 |
| 4,513,525 | 4/1985 | Ward et al. | 43/55 |
| 4,677,785 | 7/1987 | Lambourn | 43/55 |
| 4,757,636 | 7/1988 | Lambourn | 43/57 |
| 5,319,877 | 6/1994 | Hagan | 43/56 |
| 5,337,892 | 8/1994 | Zaffina | 206/315.11 |
| 5,542,206 | 8/1996 | Lisch | 43/54.1 |
| 5,634,291 | 6/1997 | Pham | 43/57 |

*Primary Examiner*—Kurt Rowan
*Attorney, Agent, or Firm*—Patent & Trademark Services; Thomas Zack; Joseph H. McGlynn

[57] ABSTRACT

A light weight plastic storage container having joined framed storage section rings detachably attached to a lower live bait well. Each ring has frame openings for several latched draws one of which has a self contained power source to aerate the bait well. An insulated beverage holder may be inserted into a formed cylindrical common center hole in the section rings. The container's top cushion can be used as a seat and has a carrying handle. Both the plastic injection molding process and the blow molding process can be used to manufacture the plastic component parts.

4 Claims, 2 Drawing Sheets

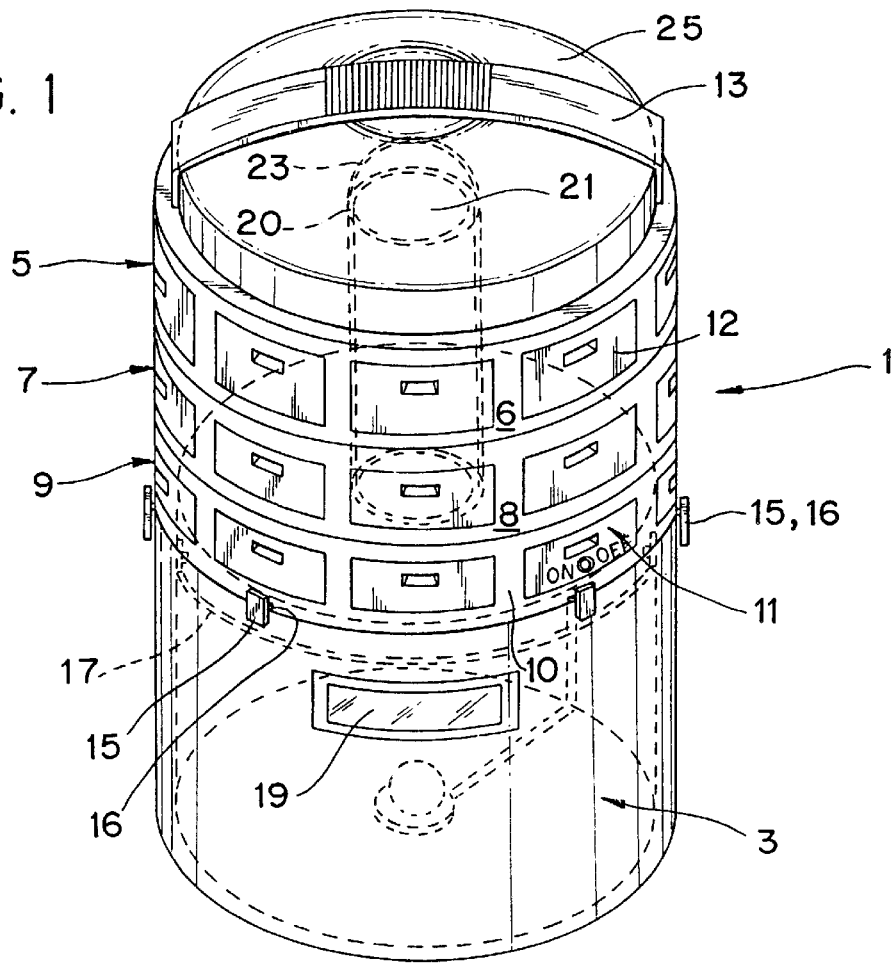
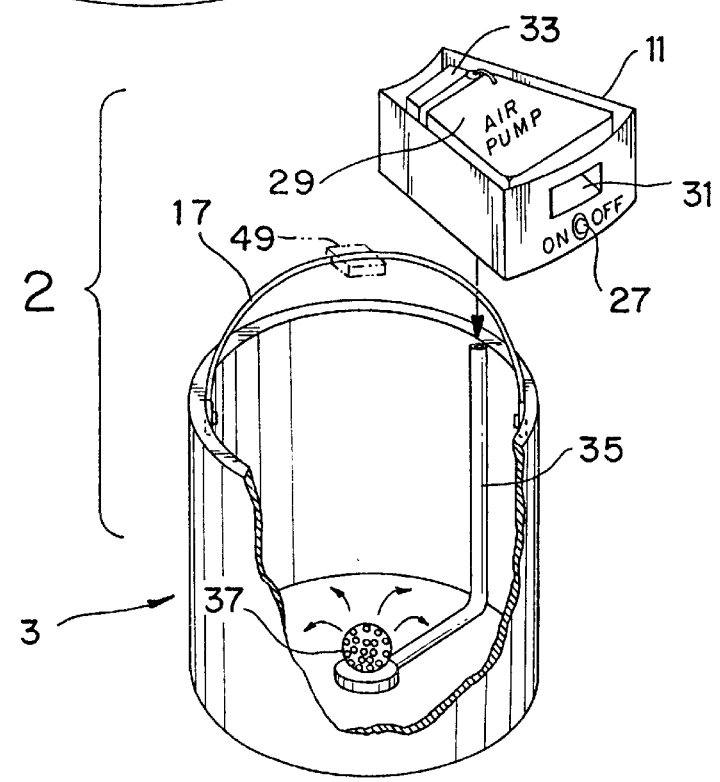

FISHING BUCKET

BACKGROUND OF THE INVENTION

The present invention relates to a lightweight plastic fish storage container having a live bait well. Included are a plurality of joined storage section rings stacked upon each other with each ring having several drawers. A center aperture extending through the rings allows beverage containers to be stored in an insulated container.

DESCRIPTION OF THE PRIOR ART

In the prior art various types of storage containers are known. In one (U.S. Pat. No. 2,680,424 to Brown) there are several stacked trays for storing and transporting fish within an insulated container. With some, such as U.S. Pat. No. 4,428,145 to Wheeler, live bait is stored in a plurality of stackable trays which are secured together by interconnecting rods and apertures on each tray. Still other containers for live bait, see U.S. Pat. No. 4,513,52 to Ward, has an inner strainer housed in an outer bucket. With still another, U.S. Pat. No. 4,677,785 to Lambourn, a self contained aerated live bait bucket is disclosed with a battery powered air pump. However, none reveal the combination of a storage container having an aerated live bait well as disclosed and claimed herein.

SUMMARY OF THE INVENTION

The present invention consists of a storage container having provision for interlocking storage sections with a detachable live bait well. Each section has several sub storage sections or drawers. One lower section drawer has a battery powered air pump to aerate the bait well. Extending vertically through the storage sections' common center is an opening into which an insulated holder for beverage containers can be placed.

It is an object of the present invention to provide an improved storage container for storing fishing tackle, live bait and beverages.

It is a further object of the present invention to provide such a container wherein the live bait can be aerated.

It is another object of the present invention to provide such a container whose live bait and storage sections may be detached from each other and whose top can act as a seat.

These and other objects and advantages of the present invention will be fully apparent from the following description, when taken in connection with the annexed drawings.

BRIEF DESCRIPTION OF THE DRAWINGS

FIG. 1 is a front view of the present storage container invention the showing its interlocking storage sections attached to its live bait well.

FIG. 2 shows a drawer supplying air to the live bait well.

DESCRIPTION OF THE PREFERRED EMBODIMENT

Figure 3:
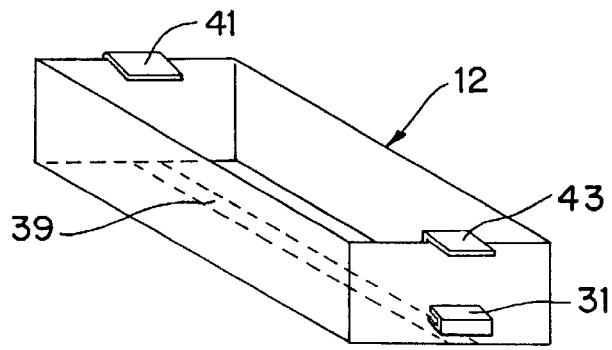
FIG. 3 illustrates a typical storage drawer.

Referring now to the drawings in greater detail, FIG. 1 shows the preferred embodiment of the present invention with its interlocking light weight ABS plastic storage sections 1 latched to its live bait well 3. The storage sections are shown as three separate joined stacked ring sections 5 (upper), 7 (middle) and 9 (lower). Each ring section has its own pie shaped sub sections or pull out latched draws which fit into openings in the respective plastic holding frame sections 6, 8, and 10. In this embodiment there are eight latched sliding drawers in each ring frame section. Except for one drawer, each of these drawers 12 may be used to store tackle or other fishing related supplies or materials. In the lower stacked ring 9 the pie shaped drawer 11 is filled with an air pump to provide air to the lower bait well, as described with respect to FIG. 2.

Carrying handle 13 may be used to transport the ring sections as a group with or without the lower plastic live bait well 3. Attaching the well to the stacked ring storage sections are several separate identical latches 15 which are spaced equally about the lower bait well's circumference. Each latch attaches to a complementary shaped hook 16. These hooks are spaced equally around the lower end of the ring 9 and placed such that each one may engage a latch. Four of the latches and hooks are shown in FIG. 1. By detaching the lower well from its upper joined storage sections, the well may be carried separately by its own internal handle 17 shown by dotted lines. A spring actuated bait see through clear plastic hinged door 19 in the well's side wall allows easy access to the well's interior without detaching the well from the upper storage sections rings.

Extending through the center of the three stacked aligned ring shaped storage sections 5, 7 and 9 is a common cylindrical shaped vertically disposed sleeve opening 20. Within this sleeve, a cylinder shaped insulated hollow beverage container holder 21 with its own handle 23 can be vertically inserted. The holder and its handle are shown by the dotted lines in FIG. 1. In one embodiment, this holder stored three 12 ounce beverage cans one placed on top of the other.

There also is a circular disc shaped storage container top 25 mounted over the top ring section 5 which functions both as a cover for the storage rings and the holder as well as a removable seat cushion. This removable top is made of a self skinning molded foam rubber material with an outer vinyl covering. It is held to the upper ring's rim by a screw thread connection or, alternately, by hook and loop (or VELCRO™) fastener or any other type of detachable fastener.

FIG. 2 shows the drawer 11 located in the lower ring section 9 used to store the air pump with its power source as connected to the lower live bait well bucket 3. This drawer has an on/off switch 27 which controls the supply of electrical power from the battery to its operating air pump 29. The drawer pull indentation 31 allows the internally latched drawer to be removed or replaced in its storage sector ring 9. A self-contained battery power source 33 is operatively connected to the air pump 29. With its pump operating, air flows via the air conduit line 35 to exit from the multiple holed aerator stone 37 located at or near the well's bottom. The exiting pumped air (see arrows), aerates the surrounding water in the live bait well to maintain the live bait.

FIG. 3 shows a typical storage pie shaped drawer in more detail. Except for the drawer 11, all the drawers 12 are essentially the same in construction and how they are mounted into the frame openings in the rings sections. An elongated bottom drawer guide track 39 is mounted in each ring opening and engages the center bottom of the drawer. At the rear of the drawer is an attached lip-like stop 41 which prevents the drawers from falling out of their respective rings but does not prevent them from being lifted out by pulling and then lifting the drawer. Convex latches 43, fixed to and located on the upper front drawer surface, act to fasten and secure the drawers in place. By depressing the latch, it is disengaged from a hole above allowing the draw to either be pulled out or, by pulling and lifting, removed from its frame opening in the ring section.

Figure 4:
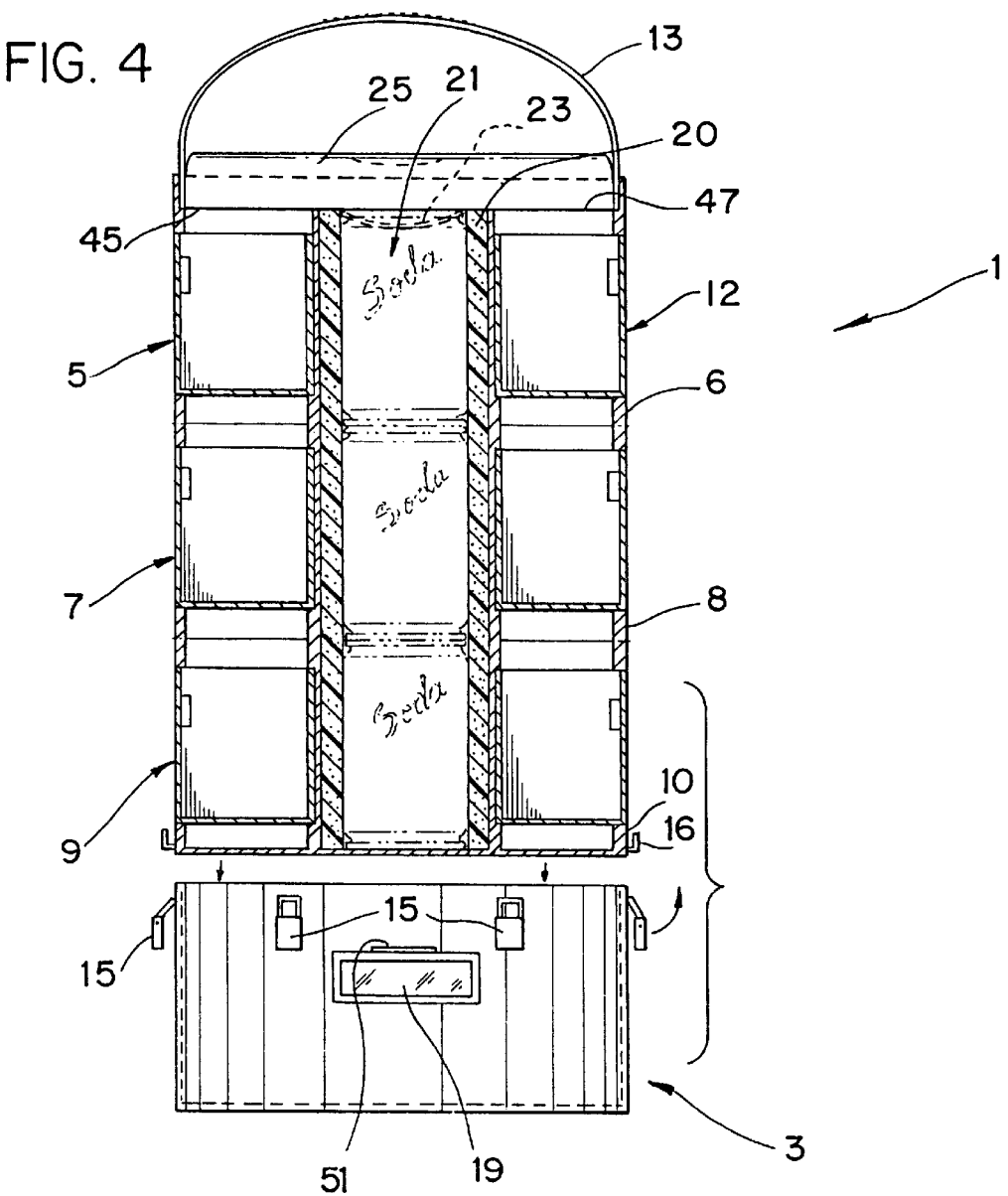
FIG. 4 depicts an exploded view of the preferred embodiment of the invention with its drawers removed.

FIG. 4 depicts an exploded view of the preferred embodiment of the invention's with all its drawers removed. At its top is the circular disc shaped storage container top 25 with its pivotally mounted handle 13. Internal screw threads 45 engages threads 47 (not shown) located on the top portion of the ringed sections to fasten the top to the storage rings. When fastened in place, the handle 13 may be used to carry the complete unit, including the bait well, or the abbreviated unit if the bait well is detached. Further down is the ring section frame with its lower hooks 16 as previously described. At the bottom is the live bait well 3. The well's handle 17 is mounted on the inside of the bait well and has an attached upper plastic block stopper 49 which floats and prevents the handle from being submerged under water. When the complete unit is assembled and carried this bait handle is not seen. Also, located on the bait well's side wall is the clear transparent door 19 which is mounted to the wall by the hinge 51.

The primary components of the storage container including the storage sector rings with their sub storage pie shaped draws can best be manufactured using the plastic injection molding process. With this process heat softened plastic material is forced under very high pressure into a relatively cool aluminum or steel two halves metal cavity mold. This mold is shaped like the desired products and high pressure hydraulics are used to keep the mold components together during the injection phase. Once the plastic cools and hardens, the hydraulic pressure is released and the mold halves separated and the formed solid removed. This process can be automated and to produce extremely detailed parts for the ring sector storage containers and their draws at a very cost effective price.

The cover 25, insulated can holder 21 and the live bait well 3 would best be made using the blow molding process. The process uses a parison (hollow tube) of plastic, and at minimum of a two part mold. This parison is heat softened and a two part cavity mold is placed around the tube. The mold pinches off one end of the tube while very hot air is blown into the other end of the plastic tube. This causes the tube to blow up like a balloon against the mold and take its shape. The two part mold is opened and the enclosure ejected and allowed to cool and harden. Thereafter second stage cutting and trimming by hand or machine can take place. Polyethylene plastic is often used in this process because of its waxy feeling and its ability to slide well within the mold. Textures can also be added to the outer surface to give it the appear of leather, grainy sand, cross-hatch, etc. Textures such as this would certainly add to the overall quality appearance of the storage container. The blow molded cover has padding added to it by way of injected self-skinning polyurethane foam. The cover may be textured to resemble leather. The skinning effect of the foam provides a surface which resembles the dash components of the interior of an automobile. Polyurethane foam is injected into a mold similar to injection molding but with much less pressure.

The bait base latches 15, spring hinge for the bait door 19, aerator stone 37 and the battery powered pump 29 are off the shelf hardware items available from commercial sources through the Thomas Register for listed suppliers.

Although the Fishin' Bucket and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A beverage and storage container comprising in combination:

at least two vertically disposed storage sections disposed one over the other with one of said sections being a lower storage section, said sections having a common vertical centrally located hole extending through each section with each of said sections having a plurality of storage drawers;

a lower live bait well detachably attached to said lower storage section, said well being connected to a power source in one of storage sections for supplying aeration to any water therein; and an insulated beverage container insertable into the common vertical hole formed in the storage sections.

2. A storage container and seat comprising in combination:

at least two vertically disposed ring shaped storage sections disposed one over the other with one of said sections being a lower storage section and the other an upper storage section, said sections having a common vertical centrally located hole extending through each section with each of said sections having a plurality of storage drawers;

each of said storage drawers being insertable into an opening in a storage section ring frame member and held therein by a latch member;

a lower live bait well detachably attached to said lower storage section, said well being connected to a power source in one of storage sections for supplying aeration to any water therein; and an upper cushioned seat and carrying handle, said handle being attached to the upper storage section.

3. The invention as claimed in claim 2, wherein said live bait well is located under the lower storage section and is detachably held thereto by a plurality of separate spaced well latches which engage hooks on said storage section.

4. The invention as claimed in claim 3, also including an internal carrying handle for the live bait well, said handle having means to keep said handle from sinking into water.

\* \* \* \* \*